(12) United States Patent
Watanabe (10) Patent No.: US 11,036,974 B2
(45) Date of Patent: Jun. 15, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yuya Watanabe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 44 days.

(21) Appl. No.: 16/282,767

(22) Filed: Feb. 22, 2019

(65) Prior Publication Data

US 2019/0266392 A1    Aug. 29, 2019

(30) Foreign Application Priority Data

Feb. 28, 2018  (JP) .............................. JP2018-035066

(51) Int. Cl.
*G06K 9/00* (2006.01)
*G06K 9/62* (2006.01)

(52) U.S. Cl.
CPC ..... *G06K 9/00362* (2013.01); *G06K 9/00778* (2013.01); *G06K 9/6202* (2013.01); *G06K 9/6262* (2013.01)

(58) Field of Classification Search
None
See application file for complete search history.

(56) References Cited

U.S. PATENT DOCUMENTS

| 2011/0274315 A1* | 11/2011 | Fan | G06K 9/00771 |
| | | | 382/103 |
| 2013/0135454 A1* | 5/2013 | Ito | H04N 5/23212 |
| | | | 348/77 |
| 2014/0152488 A1* | 6/2014 | Baba | G01S 13/867 |
| | | | 342/70 |

(Continued)

FOREIGN PATENT DOCUMENTS

JP    2009-211311 A    9/2009
JP    2018-22340 A    2/2018

OTHER PUBLICATIONS

Yingying Zhang, Single-Image Crowd Counting via Multi-Column Convolutional Neural Network; pp. 589-597. provided by the Computer Vision Foundation (CVF) 2016.

*Primary Examiner* — David Perlman
(74) *Attorney, Agent, or Firm* — Canon U.S.A., Inc. IP Division (57) ABSTRACT

An image processing apparatus includes a first detection unit that executes first detection processing for detecting an object presumed to be a human from an image by using a trained model relating to humans, a second detection unit that executes second detection processing for detecting an object presumed to be a human from the image at least by using pattern matching, a determination unit that determines whether the object detected through the first detection processing corresponds to the object detected through the second detection processing, a correction unit that corrects a detection result relating to the object that is detected through the first detection processing and is determined to correspond to the object detected through the second detection processing, and a calculation unit that calculates the number of humans in the image based at least the detection result corrected by the correction unit.

10 Claims, 8 Drawing Sheets

(56) References Cited

U.S. PATENT DOCUMENTS

2016/0335490 A1* 11/2016 Wang .................. G06K 9/00778
2017/0228888 A1*  8/2017 Kawaguchi .......... G06K 9/6271
2020/0302657 A1*  9/2020 Shimazu ................... B60R 1/00

* cited by examiner

IMAGE PROCESSING APPARATUS, IMAGE PROCESSING METHOD, AND STORAGE MEDIUM

BACKGROUND

Field

The present disclosure relates to an image processing apparatus, an image processing method, and a storage medium.

Description of the Related Art

Systems for measuring the number of people and a degree of people congestion in a captured image have been proposed. Such systems enable the degree of congestion to be detected and a degree of people's attention to be grasped from the congestion, and thus, is expected to be used for relief of congestion and for marketing aimed at collecting people. Japanese Patent Application Laid-Open No. 2009-211311 discloses a technique for measuring the number of humans with detection of a human shape. "Yingying Zhang, Desen hou, Siqin Chen, Shenghua Gao, Yi Ma. Single-Image Crowd Counting via Multi-Column Convolutional Neural Network. CVPR, 2016" discusses a technique for measuring the number of humans with estimation of a likelihood of a target being a human from a head in a crowded environment by using a trained model learned with training data including a crowd of people.

In human detection using a human shape as discussed in Japanese Patent Application Laid-Open No. 2009-211311, a human can be detected with high accuracy in a place where there is little overlapping of humans. However, in such human detection, the accuracy of the detection reduces in a densely populated place, for example, an environment where shapes of humans are hidden by other objects. In human detection based on head detection, a human can be detected with high accuracy in a densely populated place where only human heads can be captured, while the accuracy of the detection reduces in a sparsely populated place because images including a crowd of objects are used as training data.

SUMMARY

In order to improve accuracy of human detection, an aspect of the present disclosure provides a first detection unit configured to execute first detection processing for detecting an object presumed to be a human from an image by using a trained model relating to humans, a second detection unit configured to execute second detection processing for detecting an object presumed to be a human from the image at least by using pattern matching, a determination unit configured to determine whether the object detected through the first detection processing corresponds to the object detected through the second detection processing, a correction unit configured to correct a detection result relating to the object that is detected through the first detection processing and is determined, by the determination unit, to correspond to the object detected through the second detection processing, and a calculation unit configured to calculate the number of humans in the image based on at least the detection result corrected by the correction unit.

Further features will become apparent from the following description of exemplary embodiments with reference to the attached drawings.

DESCRIPTION OF THE EMBODIMENTS

Hereinafter, exemplary embodiments of the present disclosure will be described with reference to the drawings.

Figure 1:
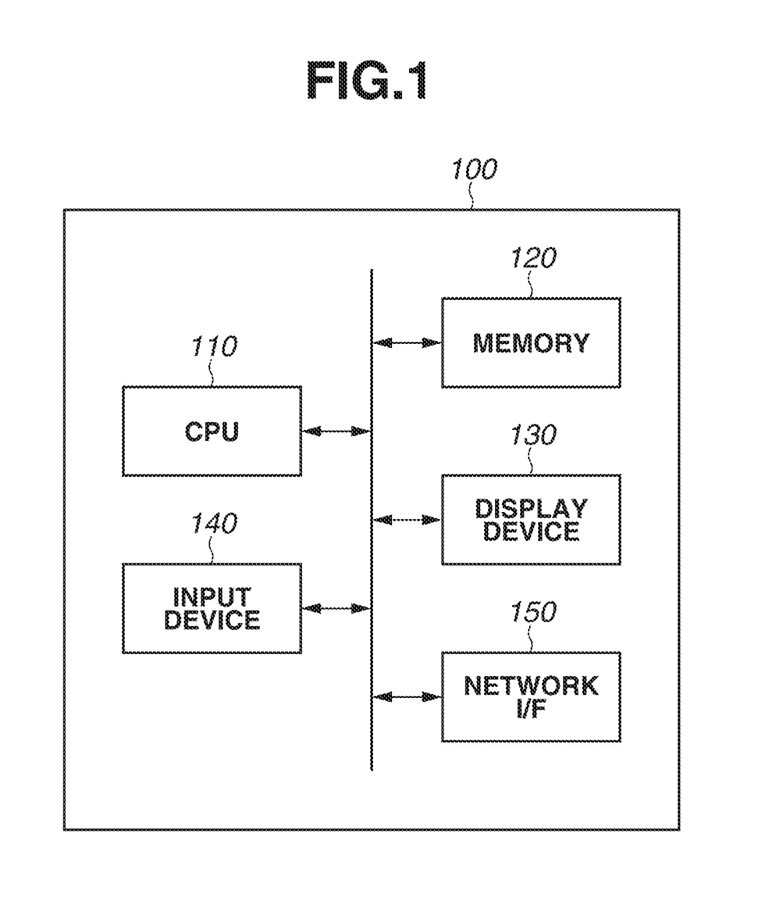
FIG. 1 is a diagram illustrating a hardware configuration of an image processing apparatus.

A first exemplary embodiment will be described below. FIG. 1 is a diagram illustrating a hardware configuration of an image processing apparatus 100 according to the present exemplary embodiment. The image processing apparatus 100 includes a central processing unit (CPU) 110, a memory 120, a display device 130, an input device 140, and a network interface (I/F) 150. The CPU 110 controls the image processing apparatus 100. The memory 120 stores data, instructions, and the like used by the CPU 110 for processing. The display device 130 is a liquid crystal monitor or the like, and displays various types of information. The input device 140 is a mouse or a keyboard, and inputs a user operation. The network I/F 150 is an interface connected to a network. By the CPU 110 executing the instructions stored in the memory 120, a function of the image processing apparatus 100 and processing are implemented.

Figure 2:
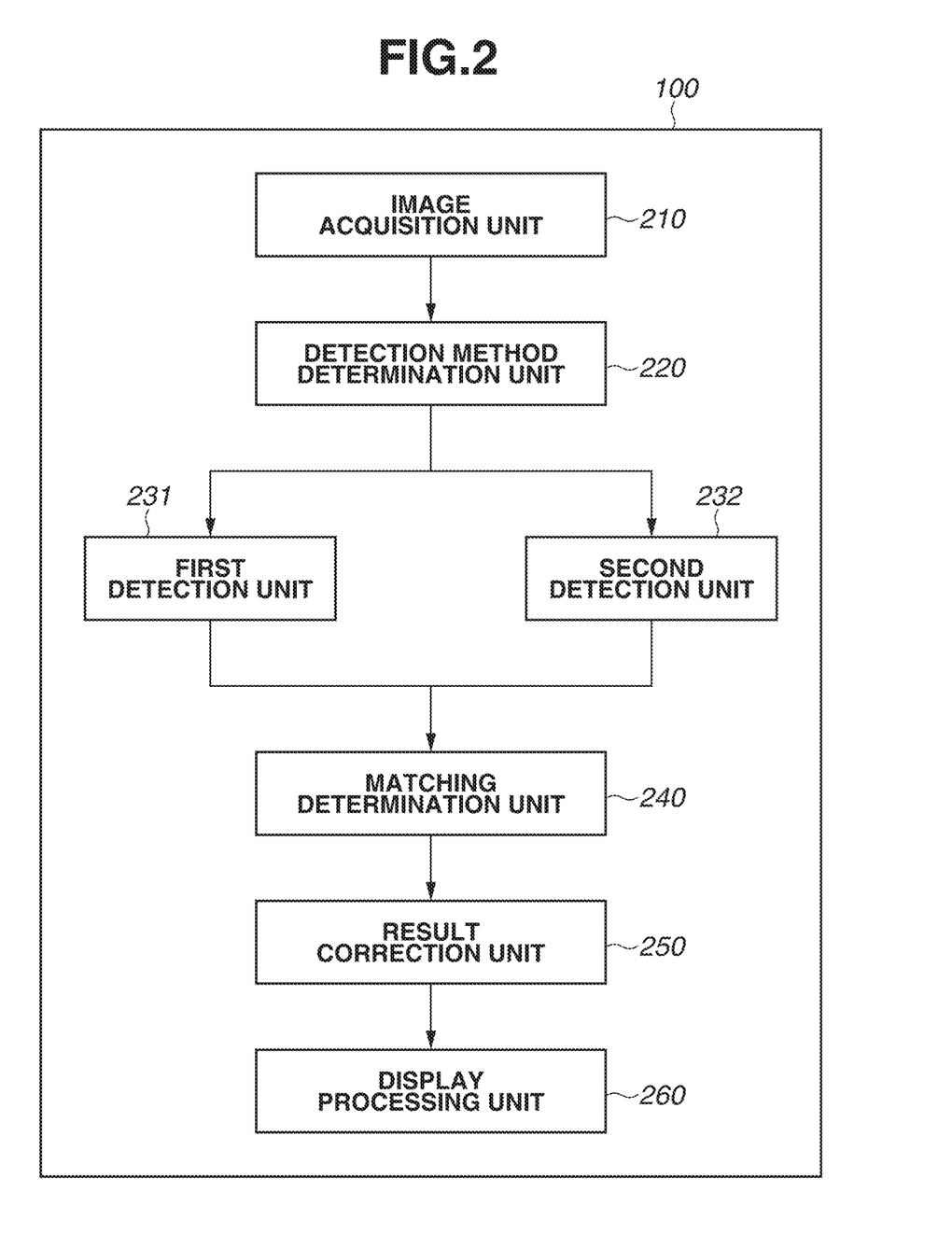
FIG. 2 is a diagram illustrating a functional configuration of the image processing apparatus.

FIG. 2 is a diagram illustrating a functional configuration of the image processing apparatus 100. The image processing apparatus 100 includes an image acquisition unit 210, a detection method determination unit 220, a first detection unit 231, a second detection unit 232, a matching determination unit 240, a result correction unit 250, and a display processing unit 260. The image acquisition unit 210 acquires an image to be subjected to human detection. The detection method determination unit 220 determines whether first detection processing, second detection processing, or both is performed on the acquired image, where the first and second processing perform human detection. The first detection processing is image processing for human detection specialized for a human head detection. In the first detection processing, an object presumed to be a human (hereinafter, also referred to as "human" or "human object") is detected by using a trained model that has learned with training data with a high density of humans. In the first detection processing, coordinates of an object presumed to be a human in the image and a likelihood of the detected object being a human is detected. As an example, the greater the likelihood is, the more likely the object is a human. In addition, as an example, the likelihood is represented by a number less than or equal to one, and is calculated for each object in the image. A sum of the likelihoods calculated for all the objects in the image is estimated to be the number of humans in the image. As the training data for generating the trained model, training data corresponding to a single human or a plurality of humans can be used.

In the second detection processing, image process is performed to detect a region presenting a characteristic shape of a human body, such as a face, an upper body, or a lower body. For example, in the second detection processing, an object presumed to be a human is detected with pattern matching using a matching pattern corresponding to the characteristic shape of a human body, such as a face, an upper body, or a lower body, while the trained model is not used. It is only required that the first detection processing and the second detection processing are different, and the specific processing thereof is not limited to those described in the present exemplary embodiment. More desirably, the first detection processing is more suitable than the second detection processing for a situation where a density of humans is higher.

Figure 3A:
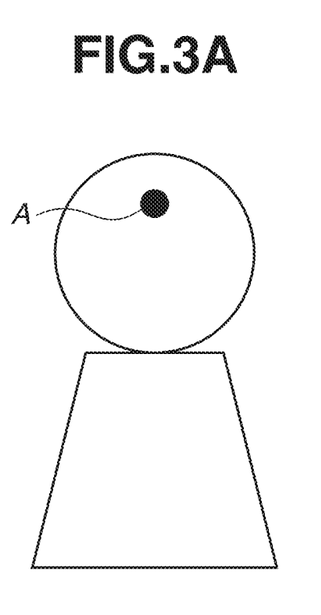
FIGS. 3A and 3B are explanatory diagrams illustrating first detection processing and second detection processing, respectively.
Figure 3B:
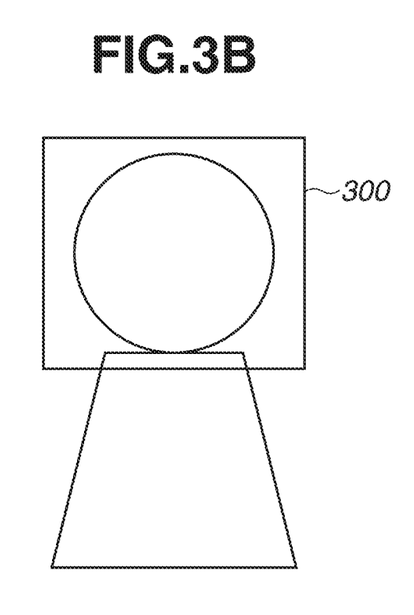

FIGS. 3A and 3B are explanatory diagrams illustrating the first detection processing and the second detection processing. FIG. 3A is a diagram illustrating a detection result of the first detection processing. As the detection result, the coordinates y) of a point A indicating a position of a head in the image and the likelihood are obtained. FIG. 3B is a diagram illustrating a detection result of the second detection processing. In the second detection processing, a region 300 presenting the characteristic shape is obtained as the detection result. In the example of FIG. 3B, the region 300 including a shape of a face as the characteristic shape is obtained.

Returning to FIG. 2, the first detection unit 231 performs the first detection processing. The second detection unit 232 performs the second detection processing. The matching determination unit 240 determines whether the same human is detected based on the detection result of the first detection unit 231 and the detection result of the second detection unit 232. That is, the matching determination unit 240 determines whether the object detected through the first detection unit 231 corresponds to the object detected through the second detection unit 232. The result correction unit 250 corrects the detection result of the first detection unit 231 (human detection result) in a case where the matching determination unit 240 determines that the same human is detected. The display processing unit 260 performs control so that the detection result of the first detection unit 231 corrected by the result correction unit 250 is displayed on the display device 130.

Figure 4:
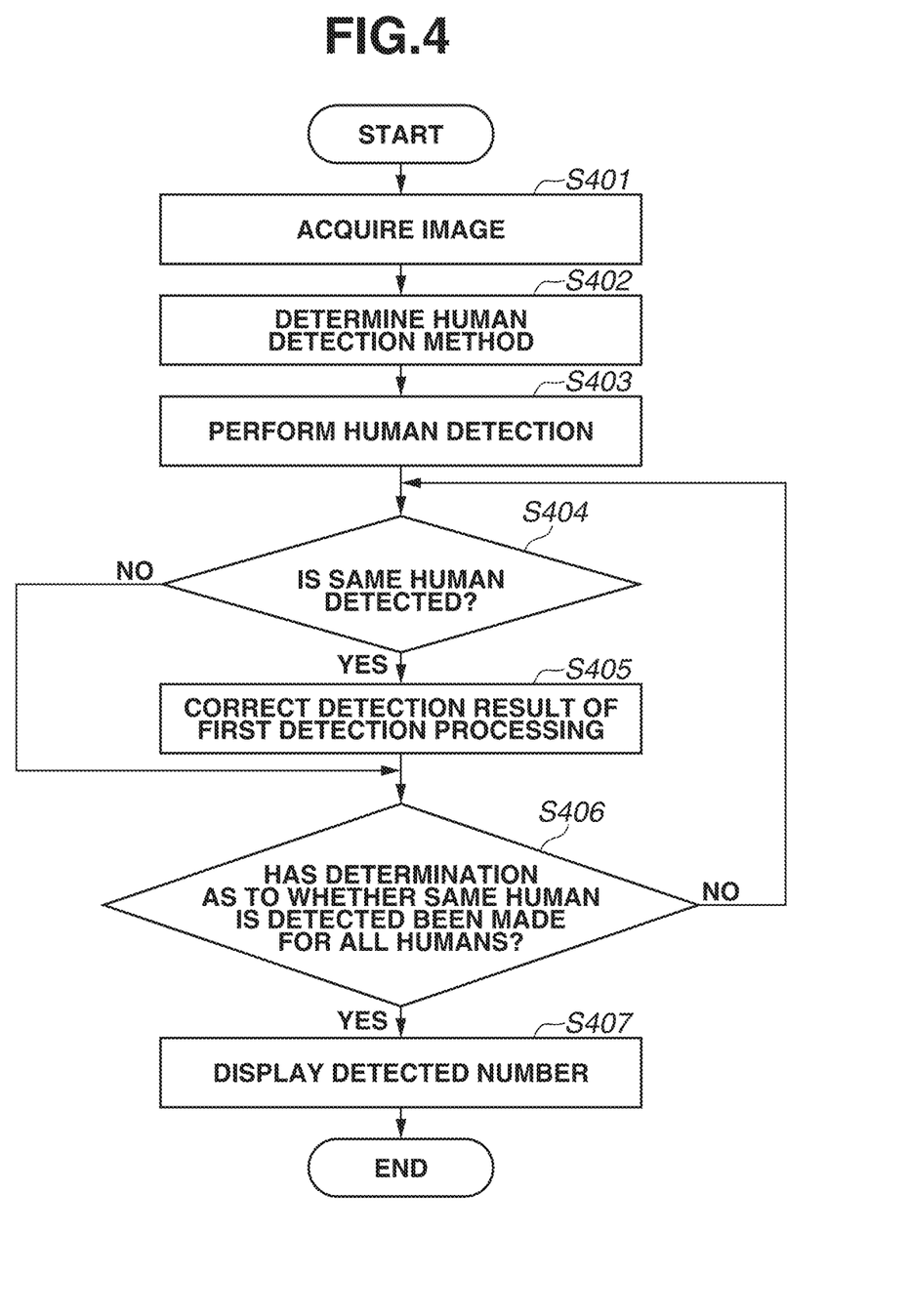
FIG. 4 is a flowchart illustrating image processing.

FIG. 4 is a flowchart illustrating image processing that is performed by the image processing apparatus 100 according to the present exemplary embodiment. In step S401, the image acquisition unit 210 acquires the image to be subjected to human detection. The image acquisition unit 210 can acquire the image from an external device, such as a camera, or, alternatively, from the memory 120. As yet another example, the image processing apparatus 100 can include a camera. In such a case, the image acquisition unit 210 can acquire an image obtained by the camera.

In step S402, the detection method determination unit 220 determines a human detection method to be performed on the image. Specifically, the detection method determination unit 220 determines whether the first detection processing, the second detection processing, or both is performed. The detection method determination unit 220 analyzes a density of humans appearing in the image to be subjected to the processing based on frequency components of the image. The detection method determination unit 220 determines that both the first detection processing and the second detection processing are performed in a case where the density exceeds a threshold value, and determines only the second detection processing is performed in a case where the density is the threshold value or less.

Figure 5A:
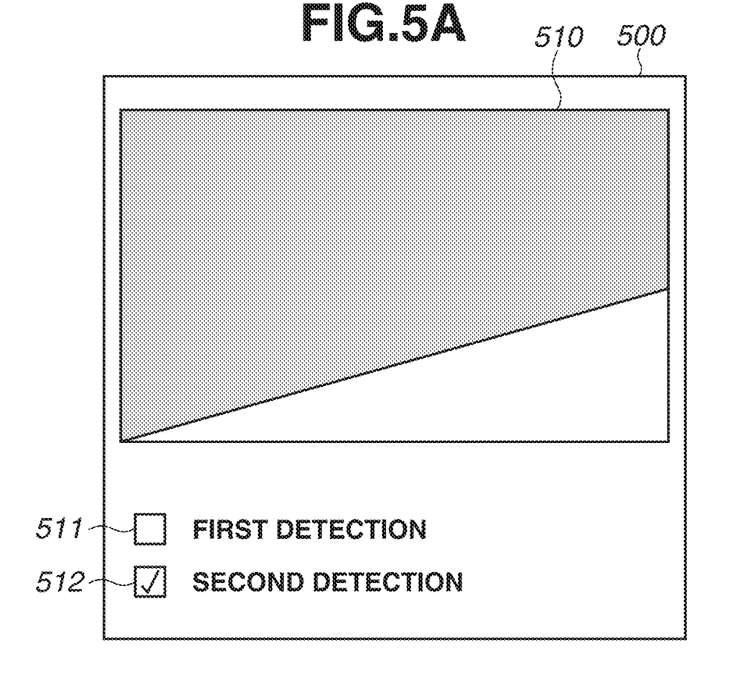
FIGS. 5A and 5B are diagrams each illustrating an example of a display screen.

Specific processing performed when the detection method determination unit 220 determines the detection processing is not limited to those described in the present exemplary embodiment. As another example, the detection method determination unit 220 can determine the detection processing based on the user operation. For example, the display processing unit 260 displays a display screen 500 illustrated in FIG. 5A. The image is displayed in an image window 510 of the display screen 500, and the density of humans appearing in the image is superimposed on the image and presented with colors. By selecting at least one of checkboxes 511 and 512 displayed on the display screen 500, a user can input an instruction to select the detection processing. Here, the checkbox 511 corresponds to the first detection processing, and the checkbox 512 corresponds to the second detection processing. Selection of the checkbox 511 inputs an instruction to select the first detection processing, and selection of the checkbox 512 inputs an instruction to select the second detection processing. Selection of both of the checkboxes 511 and 512 inputs an instruction to select both the first and second processing.

Figure 5B:
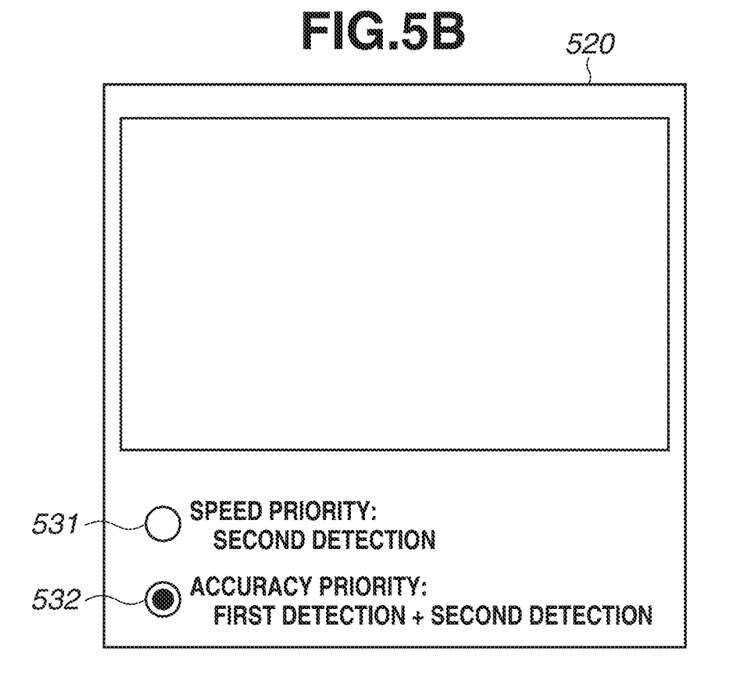

In addition, the display processing unit 260 can display checkboxes based on processing load. For example, on a display screen 520 illustrated in FIG. 5B, a speed priority checkbox 531 and an accuracy priority checkbox 532 are displayed. The speed priority checkbox 531 is a user interface (UI) for inputting an instruction to perform only the second detection processing, and the accuracy priority checkbox 532 is a UI for inputting an instruction to perform both the first and the second detection processing.

Figure 6:
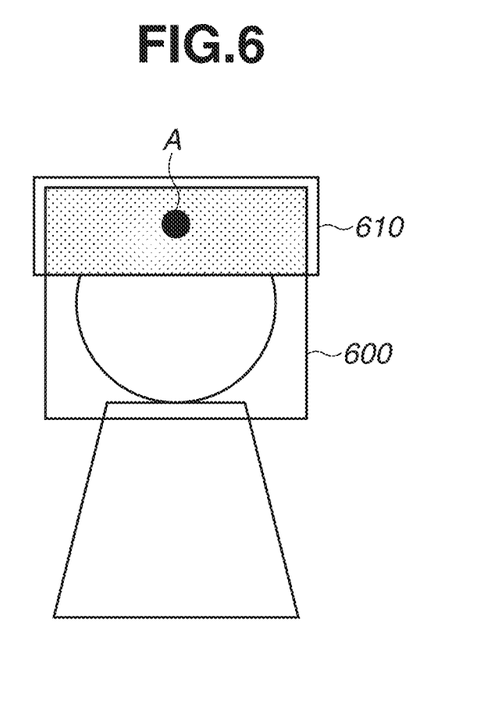
FIG. 6 is an explanatory diagram illustrating matching determination processing for humans.

Returning to FIG. 4, after the processing of step S402, in step S403, the detection processing determined in step S402 is executed. In step S404, in a case where both the first and the second detection processing are executed in step S403, the matching determination unit 240 determines whether the human detected through the second detection processing is the same as the human detected through the first detection processing. FIG. 6 is an explanatory diagram illustrating the processing of step S404. If a region 600 is detected as a shape of a human body in the second detection processing, the matching determination unit 240 specifies a part of the region 600 as a head region 610. In a case where a head position A detected through the first detection processing is included in the head region 610, the matching determination unit 240 determines that the human detected through the first detection processing is the same as the human detected through the second detection processing.

Returning to FIG. 4, in step S404, if the matching determination unit 240 determines that the same human is detected in the first and the second processing (YES in step S404), the processing proceeds to step S405. If the matching determination unit 240 does not determine that the same human is detected in the first and the second processing (NO in step S404), the processing proceeds to step S406. In step S405, the result correction unit 250 corrects the likelihood of the target being human, which is obtained as the detection result of the first detection processing, to a higher value. The result correction unit 250 corrects the likelihood to a maximum value, for example. As another example, the result correction unit 250 can add a value set by the user to the likelihood. That is, the result correction unit 250 can add the likelihood based on the user operation. As another example, the result correction unit 250 can obtain a correction value from the detection result of the second detection processing and correct the likelihood based on the correction value. It is sufficient that the result correction unit 250 corrects the likelihood of the human object being human to be relatively higher than a likelihood of another human object or other human objects being human. As yet another example, the result correction unit 250 can lower a likelihood of another object or other objects being human other than the target, whereby a relative value of the likelihood of the target being human becomes higher.

In step S406, the matching determination unit 240 determines whether the determination whether the same human is detected has been made for all the human objects detected through the first detection processing. If the matching determination unit 240 determines that the determination has been made for all the human objects (YES in step S406), the processing proceeds to step S407. If the matching determination unit 240 determines that a human object for which the determination processing has not performed remains (NO in step S406), the processing proceeds to step S404. In such a case, the processing after step S404 is continued with the human object for which the determination processing has not been performed being treated as a target to be processed.

In step S407, the result correction unit 250 performs control so that the value indicating a likelihood of a human object being a human and a detected number, i.e., the number of detected human objects, obtained as the corrected detection result of the first detection processing are displayed on the display device 130. With this process, the image processing ends. In a case where the detected number after the correction includes a decimal fraction, the decimal fraction can be rounded up or down so that the detected number becomes an integer. Here, the process of step S407 is merely an example of the display process.

As described above, the image processing apparatus 100 according to the present exemplary embodiment improves detection accuracy by combining a plurality of detection processing types as compared with a case where only one detection processing type is performed.

As a modification of the first exemplary embodiment, a plurality of head coordinates detected through the first detection processing can be included in the head region detected through the second detection processing. In such a case, the matching determination unit 240 determines that the same human is detected for only one of the plurality of head coordinates. The method of determining one of the plurality of head coordinates is optional. For example, the matching determination unit 240 can determine that the same human is detected for only the head coordinates with the highest likelihood of the object being a human. As yet another example, the matching determination unit 240 can determine that the identical human is detected for only head coordinates with the lowest likelihood of the object being a human.

Figure 7:
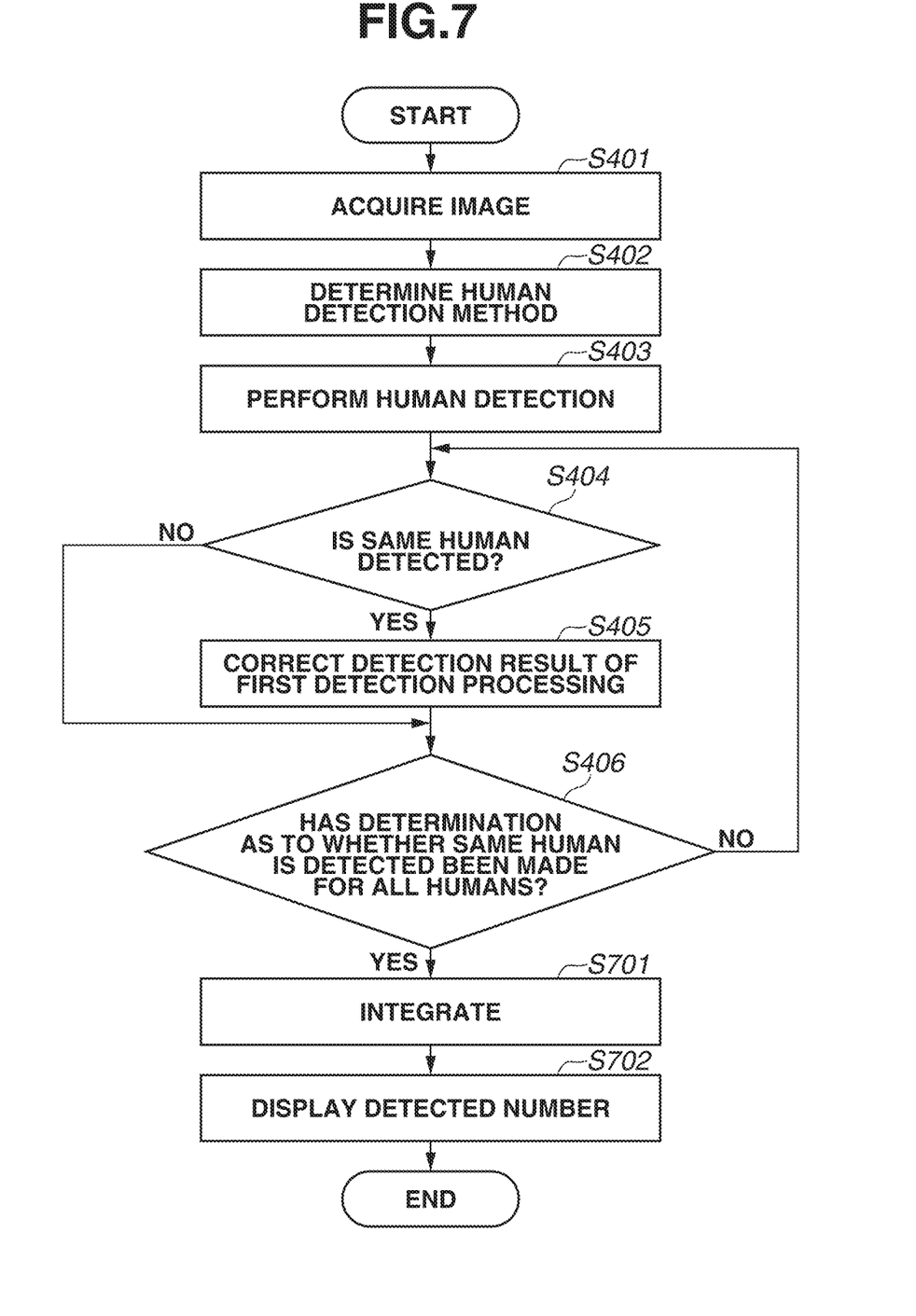
FIG. 7 is a flowchart illustrating image processing according to a second exemplary embodiment.

A second exemplary embodiment of the present invention will be described below. An image processing apparatus 100 according to the present exemplary embodiment will be described, focusing mainly on differences from the image processing apparatus 100 according to the first exemplary embodiment. FIG. 7 is a flowchart illustrating image processing performed by the image processing apparatus 100 according to the present exemplary embodiment. In each process of the image processing illustrated in FIG. 7, processes of the image processing same as those of the image processing according to the first exemplary embodiment described with reference to FIG. 4 are denoted by the same reference numeral. After step S406, in step S701, a result correction unit 250 integrates a detection result of the first detection processing after correction and a detection result of second detection processing. More specifically, the result correction unit 250 determines, as an integration result, a value obtained by subtracting the number of detected same human objects from a sum of the detected number (the number of detected human objects), obtained through the first detection processing, after correction and the detected number (the number of detected human objects) obtained through the second detection processing, that is, a union. Here, the detected number, obtained through the first detection processing, after the correction is a sum of likelihoods after the correction. In addition, the detected number obtained with the second detection processing is a sum of the number of human objects detected through the second detection processing.

Figure 8:
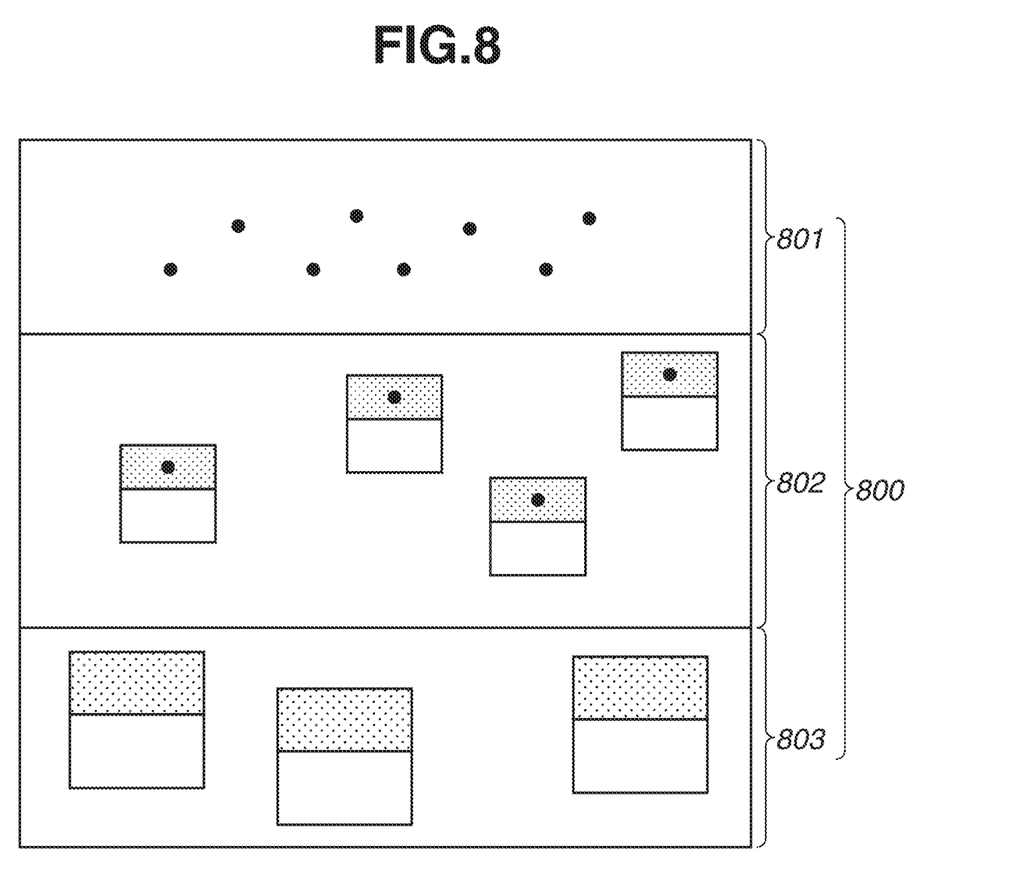
FIG. 8 is a diagram illustrating an example of a detection result.

For example, as illustrated in FIG. 8, eight human objects are detected in a region 801 of a region 800 only with the first detection processing. In a region 802, four human objects are detected through both the first detection processing and the second detection processing. In a region 803, three human objects are detected only through the second detection processing. In such a case, the result correction unit 250 obtains the detected number 15 in the region 800 by subtracting the detected number 4 in the region 802 from a sum 19 of the detected number 12 detected through the first detection processing and the detected number 7 through the second detection processing.

Returning to FIG. 7, after step S701, in step S702, a display processing unit 260 performs control so that the union is displayed as the detected number. With this process, the image processing ends. Other configurations of the image processing apparatus 100 and other processes according to the second exemplary embodiment are similar to those according to the first exemplary embodiment. As described above, the image processing apparatus 100 according to the present exemplary embodiment can also count a human object detected only with one detection method out of a plurality of detection methods.

While exemplary embodiments of the present invention have been described in detail above, the present disclosure is not limited to the specific exemplary embodiments, and various modifications and changes can be made within a scope of the present disclosure.

According to each of the exemplary embodiments described above, accuracy of human detection can be improved.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-035066, filed Feb. 28, 2018, which is hereby incorporated by reference herein in its entirety.

What is claimed is:

1. An image processing apparatus comprising:
   a memory storing instructions; and
   a processor to execute the instructions to function as:
      a first detection unit configured to execute first detection for detecting an object presumed to be a human from an image by using a trained model relating to humans;
      a second detection unit configured to execute second detection for detecting an object presumed to be a human from the image at least by using pattern matching;
      a determination unit configured to determine whether the object detected through the first detection corresponds to the object detected through the second detection;
      a correction unit configured to correct a detection result of a corresponding object that is detected through the first detection and is determined, by the determination unit, to correspond to the object detected through the second detection; and
      a calculation unit configured to count a number of humans in the image based on at least the detection result corrected by the correction unit,
   wherein the correction unit is configured to correct the detection result of the corresponding object, so that the corresponding object is counted as one human by the calculation unit,
   wherein a detection result by the first detection is represented by a value of a likelihood indicating how likely the object detected through the first detection is a human, and
   wherein, the calculation unit counts the number of humans in the image, by summing up the plurality of values of the likelihood.

2. The image processing apparatus according to claim 1, wherein the first detection is used where a density of humans is high.

3. The image processing apparatus according to claim 1, wherein a head is detected through the first detection, and wherein one or more of a face, an upper body, or a lower body is detected through the second detection.

4. The image processing apparatus according to claim 1, wherein the correction unit corrects the detection result of the first detection based on a user operation.

5. The image processing apparatus according to claim 1, wherein the processor further executes the instructions to function as a display control unit configured to perform control such that the detection result of the first detection corrected by the correction unit is displayed.

6. The image processing apparatus according to claim 1, wherein the calculation unit is configured to count the number of humans detected from the image by integrating the detection result of the first detection corrected by the correction unit and the detection result of the second detection.

7. The image processing apparatus according to claim 6, wherein the processor further executes the instructions to function as a display control unit configured to perform control such that the number of humans counted by the calculation unit is displayed on a display unit.

8. The image processing apparatus according to claim 1,
   wherein the first detection unit calculates a likelihood indicating how likely the object detected through the first detection is a human, and
   wherein the correction unit corrects the likelihood of the corresponding object to be 1.

9. An image processing method comprising:
   executing first detection for detecting an object presumed to be a human from an image by using a trained model relating to humans;
   executing second detection for detecting an object presumed to be a human from the image at least by using pattern matching;
   determining whether the object detected through the first detection corresponds to the object detected through the second detection;
   correcting a detection result of a corresponding object that is detected through the first detection and is determined in the determining to correspond to the object detected through the second detection; and
   counting a number of humans in the image based on at least the detection result corrected in the correcting,
   wherein the correcting the detection result comprises correcting the detection result of the corresponding object, so that the corresponding object is counted as one human,
   wherein a detection result of the first detection is represented by a value of a likelihood indicating how likely the object detected through the first detection is a human, and
   wherein, the number of humans in the image is calculated by summing up the plurality of values of the likelihood.

10. A non-transitory storage medium storing instructions for causing a computer to execute a method, the method comprising:
   executing first detection for detecting an object presumed to be a human from an image by using a trained model relating to humans;
   executing second detection for detecting an object presumed to be a human from the image at least by using pattern matching;
   determining whether the object detected through the first detection corresponds to the object detected through the second detection;
   correcting a detection result of a corresponding object that is detected through the first detection and is determined, by the determining, to correspond to the object detected through the second detection; and
   counting a number of humans in the image based on at least the detection result corrected in the correcting, wherein the correcting the detection result comprises correcting the detection result of the corresponding object, so that the corresponding object is counted as one human, wherein a detection result of the first detection is represented by a value of a likelihood indicating how likely the object detected through the first detection is a human, and wherein, the number of humans in the image is calculated by summing up the plurality of values of the likelihood.

* * * * *